(12) United States Patent
Massarik et al.

(10) Patent No.: US 11,762,076 B2
(45) Date of Patent: Sep. 19, 2023

(54) METHODS AND SYSTEMS FOR DETECTING AND PASSIVELY MONITORING COMMUNICATIONS OF AN UNMANNED AERIAL VEHICLE

(71) Applicant: CACI, Inc.-Federal, Reston, VA (US)

(72) Inventors: David Michael Massarik, Burke, VA (US); Nathan D. Flower, Las Vegas, NV (US)

(73) Assignee: CACI, Inc. - Federal, Reston, VA (US)

( * ) Notice: Subject to any disclaimer, the term of this patent is extended or adjusted under 35 U.S.C. 154(b) by 0 days.

(21) Appl. No.: 17/836,011

(22) Filed: Jun. 9, 2022

(65) Prior Publication Data

US 2022/0317275 A1 Oct. 6, 2022

Related U.S. Application Data

(63) Continuation of application No. 16/527,616, filed on Jul. 31, 2019, now Pat. No. 11,385,341.

(51) Int. Cl.

| | | |
|---|---|---|
| *G01S 13/28* | (2006.01) | |
| *G08G 5/00* | (2006.01) | |
| *H04B 7/06* | (2006.01) | |
| *H04B 7/185* | (2006.01) | |
| *G01S 13/00* | (2006.01) | |

(52) U.S. Cl.
CPC .......... *G01S 13/288* (2013.01); *G08G 5/0013* (2013.01); *G08G 5/0026* (2013.01); *H04B 7/0621* (2013.01); *H04B 7/18506* (2013.01)

(58) Field of Classification Search
CPC .. G01S 13/288; G08G 5/0013; G08G 5/0026; G08G 5/0056; G08G 5/0082; G08G 5/006; G08G 5/0069; H04B 7/0621; H04B 7/18506; G05D 1/00
See application file for complete search history.

(56) References Cited

U.S. PATENT DOCUMENTS

| | | | |
|---|---|---|---|
| 9,805,273 B1 | 10/2017 | Seeber et al. | |
| 10,061,018 B1 | 8/2018 | Naboulsi | |
| 10,229,329 B2* | 3/2019 | Seeber | G08G 5/0082 |
| 10,679,510 B2* | 6/2020 | Gong | G08G 5/0069 |

(Continued)

FOREIGN PATENT DOCUMENTS

| | | |
|---|---|---|
| GB | 2536043 A | 9/2016 |
| GB | 2546438 A | 7/2017 |
| WO | 2018/044231 A1 | 3/2018 |

*Primary Examiner* — Bernarr E Gregory
(74) *Attorney, Agent, or Firm* — BakerHostetler

(57) ABSTRACT

The present application at least describes a non-transitory computer readable medium including program instructions that when executed by a processor effectuate a set of actions. The program instructions include causing a scan of a radio frequency spectrum to detect one or more radio signals transmitted within a pre-defined area. The program instructions also include causing a capture of a radio signal of interest from the one or more radio signals. The program instructions also include demodulating the radio signal of interest to determine coded sensor data carried thereon. The program instruction further include decoding the coded sensor data to determine a characteristic of the sensor data. The program instruction further include generating an alert based on the characteristic of the sensor data.

20 Claims, 8 Drawing Sheets

(56) References Cited

U.S. PATENT DOCUMENTS

| | | |
|---|---|---|
| 11,022,407 B2 | 6/2021 | Whitmarsh et al. |
| 11,385,341 B2 * | 7/2022 | Massarik ............ H04B 7/18506 |
| 2008/0088508 A1 | 4/2008 | Smith |
| 2011/0267222 A1 | 11/2011 | Craig |
| 2015/0254988 A1 * | 9/2015 | Wang ................... G08G 5/0026 |
| | | 701/3 |
| 2015/0350914 A1 | 12/2015 | Baxley et al. |
| 2016/0125740 A1 * | 5/2016 | Pasko ................... G08G 5/0069 |
| | | 701/528 |
| 2016/0245907 A1 | 8/2016 | Parker et al. |
| 2017/0004662 A1 * | 1/2017 | Gong ....................... G05D 1/00 |
| 2017/0039860 A1 | 2/2017 | Just |
| 2018/0129881 A1 | 5/2018 | Seeber et al. |
| 2019/0180630 A1 | 6/2019 | Kleinbeck |

\* cited by examiner

METHODS AND SYSTEMS FOR DETECTING AND PASSIVELY MONITORING COMMUNICATIONS OF AN UNMANNED AERIAL VEHICLE

CROSS-REFERENCE TO RELATED APPLICATION

This application is a continuation of U.S. patent application Ser. No. 16/527,616, filed on Jul. 31, 2019, now U.S. Pat. No. 11,385,341, which is incorporated by reference herein in its entirety.

FIELD

This application generally relates to unmanned aerial vehicles and more particularly to detecting and passively monitoring communications of an unmanned aerial vehicle.

BACKGROUND

Recent technological advancements and consumer demand have allowed for widespread, low-cost availability of unmanned aerial vehicles, such as quadcopters or other drones. Such technological advancements have also resulted in increased communication range, longer flight times, and heavier payload capacities. Gains have also be made in autonomous flight controls, on-board sensors, and video capture equipment. Yet these improvements continue to raise concerns that unmanned aerial vehicles, in particular consumer-grade drones, may be used for nefarious or harmful purposes. For example, a drone may enter restricted airspace at an airport and cause a plane to crash. Or a drone may be laden with explosives and used in a direct attack on a facility or group of people. Drones may also be used for corporate or industrial espionage, such as capturing images of classified vehicle prototypes at a car manufacturer's test facility. As yet another example, a drone operating near an outside concert venue may illegally record a musical performance. Due to the low cost and wide availability of consumer-grade drones, however, direct measures against an intruding drone, such as shooting down, are often insufficient deterrents.

Thus, what is desired in the art is a technique and architecture for detecting and passively monitoring communications of an unmanned aerial vehicle.

SUMMARY

The foregoing needs are met, to a great extent, by the disclosed systems, methods, and techniques for detecting and passively monitoring communication of an unmanned aerial vehicle.

One aspect of the patent application is directed to a non-transitory computer readable medium including program instructions that when executed by a processor effectuate a set of actions. The program instructions include causing a scan of a radio frequency spectrum to detect one or more radio signals transmitted within a pre-defined area. The program instructions also include causing a capture of a radio signal of interest from the one or more radio signals. The program instructions also include demodulating the radio signal of interest to determine coded sensor data carried thereon. The program instructions further include decoding the coded sensor data to determine a characteristic of the sensor data. The program instructions even further include generating an alert based on the characteristic of the sensor data.

Another aspect of the patent application is directed to a non-transitory computer readable medium including program instructions that when executed by a processor effectuate a set of actions. The program instructions include causing a scan of a radio frequency spectrum to detect one or more radio signals transmitted within a pre-defined area. The program instructions also include causing a capture of a radio signal of interest associated with a device. The program instructions also include demodulating the radio signal of interest to determine coded video data carried thereon. The program instructions further include decoding the coded video data. The program instructions even further include determining a location associated with the device based on the decoded video data.

Yet another aspect of the patent application is directed to a non-transitory computer readable medium including program instructions that when executed by a processor effectuate a set of actions. The program instructions include causing a first scan of a radio frequency spectrum, by a scanning receiver, to detect one or more radio signals transmitted within a pre-defined area and a first reception range of the scanning receiver. The program instructions also include determining a modulated first radio signal of interest from the one or more radio signals transmitted within the first reception range. The program instructions even also include based on the first radio signal of interest, causing a second scan of the radio frequency spectrum, by the scanning receiver, to detect one or more radio signals transmitted within a second reception range of the scanning receiver. The program instructions further include determining a modulated second radio signal of interest from the one or more radio signals transmitted within the second reception range. The program instructions even further include demodulating the first and second radio signals of interest to determine first coded data carried by the first radio signal of interest and second coded data carried by the second radio signal of interest. The program instruction yet even further include generating an alert based on at least one of the first coded data and the second coded data.

There has thus been outlined, rather broadly, certain embodiments of the application in order that the detailed description thereof herein may be better understood, and in order that the present contribution to the art may be better appreciated. There are, of course, additional embodiments of the application that will be described below and which will form the subject matter of the claims appended hereto.

BRIEF DESCRIPTION OF THE DRAWINGS

To facilitate a fuller understanding of the application, reference is made to the accompanying drawings, in which like elements are referenced with like numerals. These drawings should not be construed to limit the application and are intended only for illustrative purposes.

DETAILED DESCRIPTION

Figure 1A:
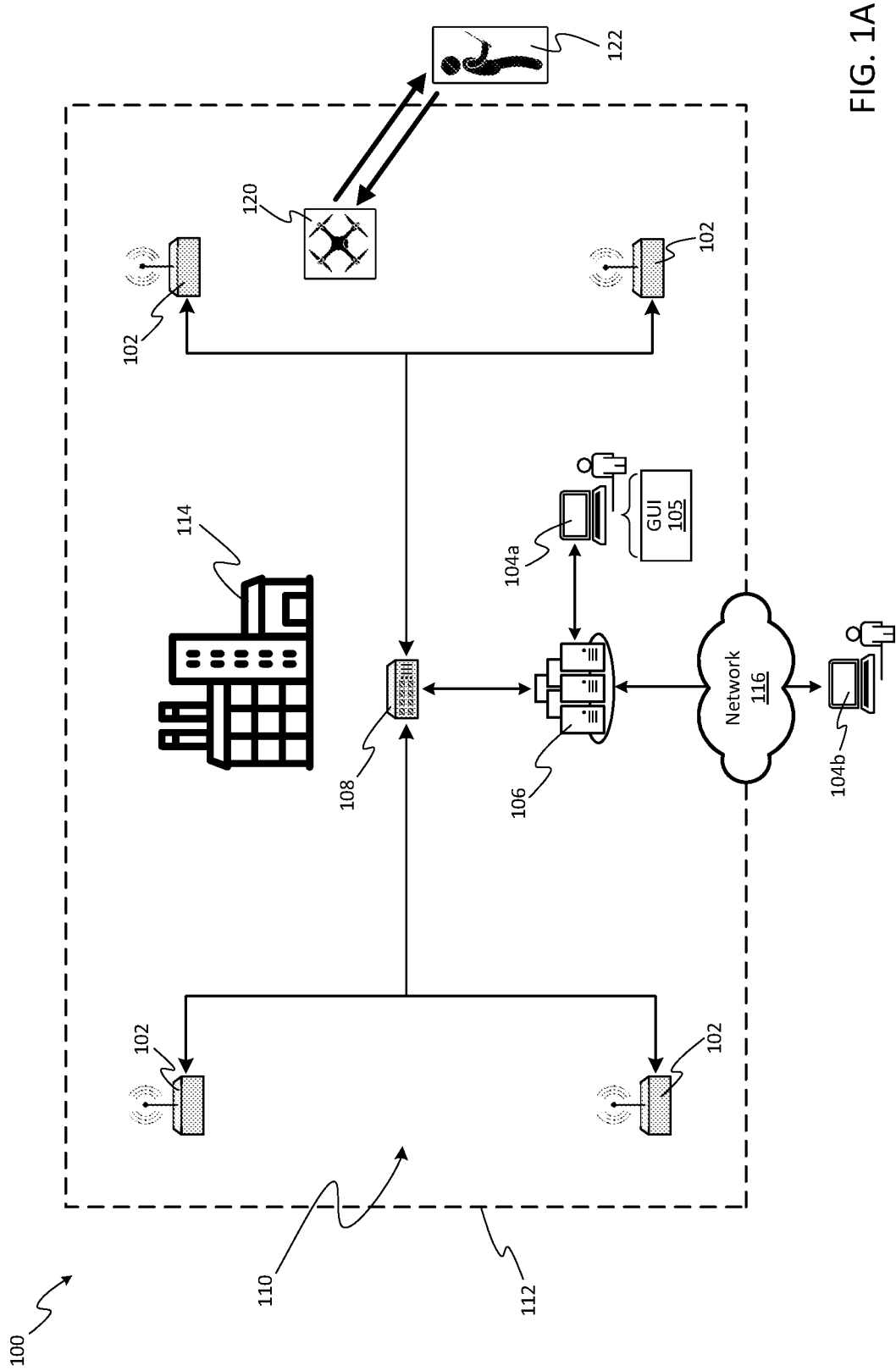
FIG. 1A illustrates a diagram of an example system according to an aspect of the application.

Before explaining at least one embodiment of the application in detail, it is to be understood that the application is not limited in its application to the details of construction and to the arrangements of the components set forth in the following description or illustrated in the drawings. The application is capable of embodiments in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other. Similarly, various requirements are described which may be requirements for some embodiments but not for other embodiments.

FIG. 1A is a diagram of an example system 100 in which one or more disclosed embodiments may be implemented. FIG. 1A illustrates an area 110 defined by a border 112. The area 110 includes a facility 114. The system 100 operates as a drone detection and monitoring system for the facility 114 and the area 110 in general. The system 100 comprises one or more scanning receivers 102 configured to scan (e.g., continuously) for radio signals between a drone 120 and its controller unit 122. Upon identifying such a radio signal, the scanning receiver 102 captures the radio signals and sends the captured radio signals to a control system 106 via a network device 108. The control system 106 decodes the radio signals and extracts various types of data carried by the radio signals, such as control data, video or image data, telemetry data, or sensor data. The decoded data may be analyzed by the control system 106 to, for example, determine the location of the detected drone 120, determine the location and/or identity of the drone operator (i.e., using the controller unit 122), or determine the type of data that the drone 120 is attempting to capture. Decoded data, such as the video data, may be presented to a system operator via a control terminal 104a, 104b (referred to generically as a control terminal 104). Further, an alert may be generated based on the decoded data.

The area 110 may include any area that is susceptible to unwanted drone intrusion or surveillance. The border 112 defining the area 110 may form a secured perimeter around the area 110. As an example, the facility 114 may include a government building subject to potential terrorist attacks or interference. As another example, the area 110 may include a remote research, development, and test area for weapons or other technology. Such research, development, and test area may be associated with a government or with a private institution, such as the aforementioned automotive test track. The facility 114 may include an industrial facility associated with confidential materials, products, equipment, etc. Such a facility 114 may include a chemical processing plant, for example. The facility 114 may include an outdoor sports stadium or concert venue. The facility 114 may also include an office building. The facility 114 may comprise a military base or installation, as another example.

An unmanned aerial vehicle shall be referred to herein as a drone and includes any of various types of unmanned aerial vehicles, including miniature and micro unmanned aerial vehicles. For example, the drone 120 may comprise a rotary wing unmanned aerial vehicle, including a multirotor unmanned aerial vehicle. A multirotor unmanned aerial vehicle may comprise a tricopter, quadcopter, hexacopter, etc. Additionally or alternatively, the drone 120 may be configured with a fixed wing design. The drone 120 may operate inflight according to various proportions of autonomous and operator controls. For example, the drone 120 may operate inflight using only autonomous control and without any operator control. As another example, the drone 120 may operate according to both autonomous and operator control. Operator controls may include inputs for gross movement of the drone 120, video or image capture, and sensor data capture. Autonomous controls may include stability controls, collision avoidance controls, position/altitude hold controls, waypoint navigation controls, and return-to-home controls.

The drone 120 may be configured with one or more sensors to capture data while the drone 120 is inflight, particularly while in or near the area 110. For example, the drone 120 may be configured with a camera to capture video and/or image data. The drone 120 may be configured with a microphone to capture sound data. The drone 120 may be configured with a chemical sensor or similar to detect and measure various gases or air-born particulate. The drone 120 may be configured with a sensor to capture data (e.g., an emission spectrum) for use in spectroscopic analysis to identify a target substance or material.

As noted, the system 100 comprises one or more scanning receivers 102. Generally, a scanning receiver 102 scans the frequency spectrum to detect and capture any radio signals that may be associated with an unauthorized drone (e.g., the drone 120). A captured radio signal may be sent to the control system 106 and/or the control terminal 104 for analysis. If the radio signal is determined to be associated with the drone 120, the scanning receiver 102 may continue to capture the radio signal and send the captured radio signal to the control system 106 and/or the control terminal 104 for it to be decoded and further analyzed.

More particularly, a scanning receiver 102 comprises one or more antennas and a receiver unit. An antenna may be omni-directional or directional (e.g. a sector antenna). An omni-directional antenna may be appropriate in a system 100 configuration with a single scanning receiver 102 while a directional antenna may be appropriate in a system 100 configuration with multiple scanning receivers 102. The one or more antennas of a scanning receiver 102 may comprise one or more of a 443 MHz antenna, a 900 MHz antenna, a 1.2 GHz antenna, a 2.4 GHz antenna, and a 5.8 GHz antenna.

A scanning receiver 102, such as the receiver unit of the scanning receiver 102, may comprise a software-defined radio (SDR). The SDR may comprise one or more receiver channels. For example, the SDR may comprise one channel for scanning for possible radio signals associated with a drone and one or more other channels for capturing radio signals already identified as being associated with a drone. In this manner, one or more identified drones and transmissions thereof may be tracked while also scanning for other as-yet unidentified drones. The SDR may be controlled by the scanning receiver 102, the control system 106, the control terminal 104, or a combination thereof. A scanning receiver 102 may operate according to one or more modulation schemes or techniques, including CDMA, OFDM, WBFM, GFSK, PWM, PCM, and PPM. A scanning receiver 102 may operate according to one or more spread spectrum techniques, including DSSS and FHSS.

The one or more scanning receivers 102 may be positioned within the area 110 to maximize radio signal detection within the area 110, particularly with respect to the facility 114. In the system 100 illustrated in FIG. 1A, the system 100 comprises four scanning receivers 102 which are positioned at the corners of the area 110. The scanning receivers 102 may be used to monitor and track multiple drones 120 within the area. In a system implementation with only a single scanning receiver 102, the scanning receiver 102 may be positioned at the facility 114, such as at the top of a building of the facility 114.

The control system 106 and the control terminal 104 generally implement the back-end portions of the system 100. The control system 106 and the control terminal 104 may overlap, to varying degrees, in the functions performed by each. For ease of description, however, signal analysis and processing and communications with the scanning receiver 102 shall be generally described with reference to the control system 106. Operator interactions with the system 100 shall be generally described with reference to the control terminal 104. In neither case is the application so limited. Although not illustrated in FIG. 1A, the system 100 may comprise a timing source in communication with the control system 106 and/or the control terminal 104. The timing source may be used for determining a location of a drone. For example, the timing source may be used in multilateration techniques to determine a location of a drone, such as time difference of arrival (TDOA) techniques.

In some embodiments, the control system 106 and the control terminal 104 are separate systems. For example, the control system 106 may comprise one or more networked servers and a storage system. In this case, the control terminal 104 may comprise a separate computing device, such as a personal computer. The control terminal 104 may be configured for direct use by an operator. The control terminal 104 may comprise a display and one or more user inputs devices (e.g., a mouse or other pointing device and a keyboard). The system 100 may comprise multiple control terminals 104. A control terminal 104 may be located onsite, as in the case of the control terminal 104a. Additionally or alternatively, a control terminal 104 may be located offsite, as in the case of the control terminal 104b, and connected to the control system 106 via a network 116. In other embodiments, the control system 106 and the control terminal 104 are integrated as a single system or computing device, which may be located onsite or offsite. A control terminal 104 may provide a graphical user interface (GUI) 105 for system interaction by a system operator. The GUI 105 may display various data described herein to the system operator. The system operator may provide various inputs described herein to the GUI 105.

The control system 106 is configured to receive radio spectrum data captured by a scanning receiver 102 while performing radio frequency scanning. The radio spectrum data from the scanning receiver 102 may be sent as a sequence of frequency and amplitude (FA) packets. The radio spectrum data may be displayed to an operator via the GUI 105 of the control terminal 104. The control system 106 determines if a radio signal represented in the radio spectrum data is potentially associated with the unauthorized drone 120 or if a radio signal is otherwise of interest. For example, the captured radio spectrum data may be compared to a record of radio spectrum data (e.g., radio signals) that are known to be associated with drones. The control system 106 may determine the frequency or frequency range of the radio signal of interest. If the radio signal is of interest, the control system 106 sends a control message to the scanning receiver 102 to cause the scanning receiver 102 to dedicate an open channel for further capture and identification of the radio signal of interest. The control message may indicate an attenuation, center frequency, bandwidth, and/or bandwidth resolution for the open channel.

An alert may be generated if the radio signal is of interest, such as an alert presented on the control terminal 104 or sent to a designated email address or phone number. The alert and the frequency of the radio signal of interest may be recorded in a log. The radio spectrum data and/or the FA packets may be also recorded based on operator input to the control terminal 104.

In an embodiment in which the system 100 comprises two or more scanning receivers 102, such as is shown in FIG. 1A, the control system 106 may receive radio spectrum data from two or more scanning receivers 102. The control system 106 may analyze all sets of radio spectrum data to determine if a radio signal of interest is found in the combined radio spectrum data. Based on the multiple sets of radio spectrum data, the control system 106 may determine a location of a source of the radio signal of interest, such as the drone 120 or its controller unit 122. If at least a third set of radio spectrum data is received by the control system 106, altitude associated with the radio signal of interest may be also determined.

The control system 106 is further configured to receive radio signal data from the scanning receiver 102 captured via the scanning receiver's 102 dedicated open channel. The radio signal data may comprise the radio signal of interest associated with the drone 120. The radio signal data may comprise digital in-phase and quadrature (I&Q) data associated with the radio signal of interest. The control system 106 demodulates the radio signal data. Demodulating the radio signal data may comprise determining the modulation scheme used to initially modulate the radio signal data. Demodulating the radio signal data may also be accomplished by determining a radio signature associated with the radio signal data and comparing that to a set of radio signatures with known associations to available makes and models of drones and/or drone controller units or components thereof (e.g., a transmitter). Results of the demodulation may be displayed on the control terminal 104. For example, the demodulated radio signal from the radio signal data may be displayed on the control terminal 104 via the GUI 105. The digital I&Q data may be recorded automatically by the control system 106.

The control system 106 is further configured to decode the demodulated radio signal data. The control system 106 may determine the decoding algorithm to use in decoding the radio signal data. For example, the control system 106 may select a decoding algorithm from a set of potential decoding algorithms. Selecting the decoding algorithm may be based on the frequency range of the radio signal data and/or the modulation scheme of the radio signal data. Additionally or alternatively, an operator may determine the decoding algorithm via the GUI 105 of the control terminal 104. For example, the operator may select from a pull-down menu of possible drone manufacturers (e.g., those associated with the frequency range of the radio signal data and/or the modulation scheme of the radio signal data) until coherent data (e.g., video or tracking data) is displayed on the control terminal 104. The decoded radio signal data may be recorded by the control system 106, automatically or based on operator input.

The decoded radio signal data may comprise any of various types of data exchanged between the drone 120 and the drone's 120 controller unit 122. For example, the decoded radio signal data may comprise control instructions from the controller unit 122 to the drone 120 that control movement of the drone 120 and/or operation of a sensor of the drone 120. For example, a control instruction may cause a video camera on the drone 120 to capture video data. The decoded radio signal data may comprise control data from the drone 120 indicating that the drone 120 received and executed the control instructions sent from the controller unit 122. As another example, a control instruction may cause a sensor on the drone 120 to take a data reading, such as a data reading indicating the presence of a certain gas or a certain type of air-born particulates.

The decoded radio signal data may comprise telemetry data, such as GPS data indicating a current or past position of the drone 120. The decoded radio signal data may comprise video or image data captured by the drone 120. Video data may comprise a real-time or near real-time video stream from the drone 120. The decoded radio signal data may comprise audio data captured by the drone 120. The audio data may comprise a real-time or near real-time audio stream. The decoded radio signal data may comprise sensor data captured by a sensor on the drone 120. The sensor data may indicate one or more measurements or sensor readings taken by the sensor. The sensor data may also include metadata describing the sensor data, such as the time that the sensor data was captured, the type of sensor that captured the sensor data, or a quality indicator of the captured data (e.g., video resolution, frame rate, or bit rate).

The network device 108 is generally configured to implement data communications between the components of the system 100. For example, a scanning receiver 102 may communicate radio signal data to the control system 106 and/or the control terminal 104 via the network device 108. The network device 108 may also enable data communications with external systems and networks via the network 116. The network device 108 may be considered as part of or an extension of the network 116. As examples, the network device 108 may comprise one or more of a gateway, a router, a switch, or a bridge. A router may include a wireless router (e.g., a Wi-Fi router), a wired router (e.g., an Ethernet router), or a combination thereof.

The network 116 may be a fixed network (e.g., Ethernet, Fiber, ISDN, PLC, or the like) or a wireless network (e.g., WLAN, cellular, or the like) or a network of heterogeneous networks. For example, the network 116 may be comprised of multiple access networks that provide communications, such as voice, data, video, messaging, broadcast, or the like. For example, the network 116 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the network 116 may comprise other networks such as a core network, the Internet, a sensor network, an industrial control network, a personal area network, a fused personal network, a satellite network, a home network, or an enterprise network, as some examples.

Figure 1B:
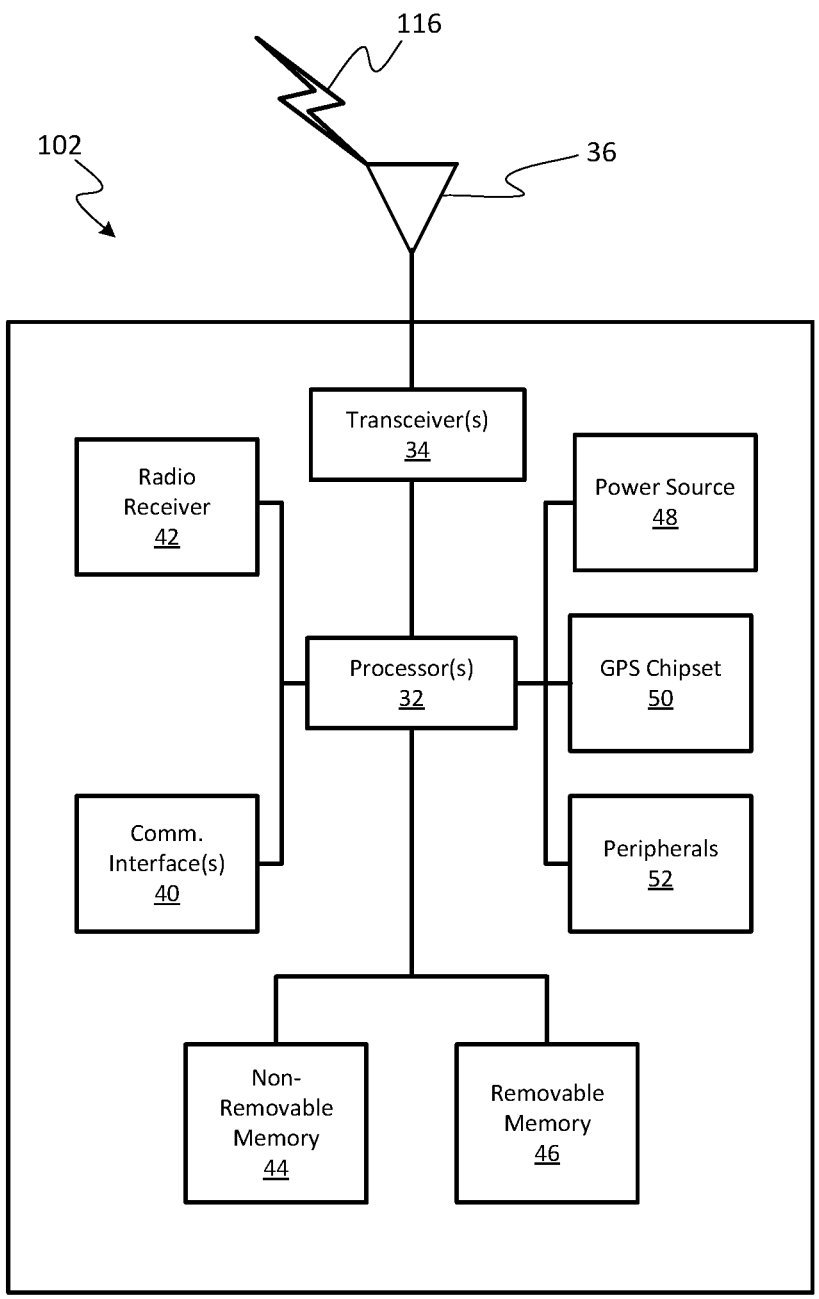
FIG. 1B illustrates a block diagram of an example scanning receiver according to an aspect of the application.

FIG. 1B is a block diagram of an exemplary hardware/software architecture of a scanning receiver 102 of FIG. 1A. As shown in FIG. 1B, the scanning receiver 102 may include one or more processors 32, a communication interface 40, a radio receiver 42, non-removable memory 44, removable memory 46, a power source 48, a global positioning system (GPS) chipset 50, and other peripherals 52. The scanning receiver 102 may also include communication circuitry, such as one or more transceivers 34 and a transmit/receive element 36. It will be appreciated that the scanning receiver 102 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., the memory 44 and/or the memory 46) of the scanning receiver 102 in order to perform the various required functions of the scanning receiver 102. The processor 32 may run radio access-layer (RAN) programs and/or other communications programs. The processor 32 may also perform security operations such as authentication, security key agreement, and/or cryptographic operations, such as at the access-layer and/or application layer for example.

The processor 32 is coupled to its communication circuitry (e.g., the transceiver 34, the transmit/receive element 36, the radio receiver 42, and the communication interface 40). The processor 32, through the execution of computer executable instructions, may control the communication circuitry in order to cause the scanning receiver 102 to communicate with other components of the system, such as the network device 108, the control system 106, and the control terminal 104. The processor 32 may further control the communication circuitry to detect and capture radio spectrum and radio signal data via the transmit/receive element 36 and the radio receiver 42. The radio receiver 42 may comprise a software-defined radio (SDR) receiver. The radio receiver 42 may define one or more channels, such as one or more channels to scan a frequency spectrum for any radio signals associated with a drone and one or more channels to capture identified radio signal data associated with a drone.

The transmit/receive element 36 may be configured to receive a signal sent from a drone to the drone's controller unit or vice versa. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals. The transceiver 34 and/or transmit/receive element 36 may be integrated with, in whole or in part, the communication interface(s) 40, particularly wherein a communication interface 40 comprises a wireless communication interface. The communication interface(s)

40 additionally or alternatively may comprise one or more wired communication interfaces.

The processor 32 may access information from, and store data in, any type of suitable memory, such as the non-removable memory 44 and/or the removable memory 46. For example, the processor 32 may store captured radio signal data (e.g., FA packets and digital I&Q data) in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a USB drive, a secure digital (SD) memory card, and the like. In other embodiments, the processor 32 may access information from, and store data in, memory that is not physically located on the scanning receiver 102.

Figure 1C:
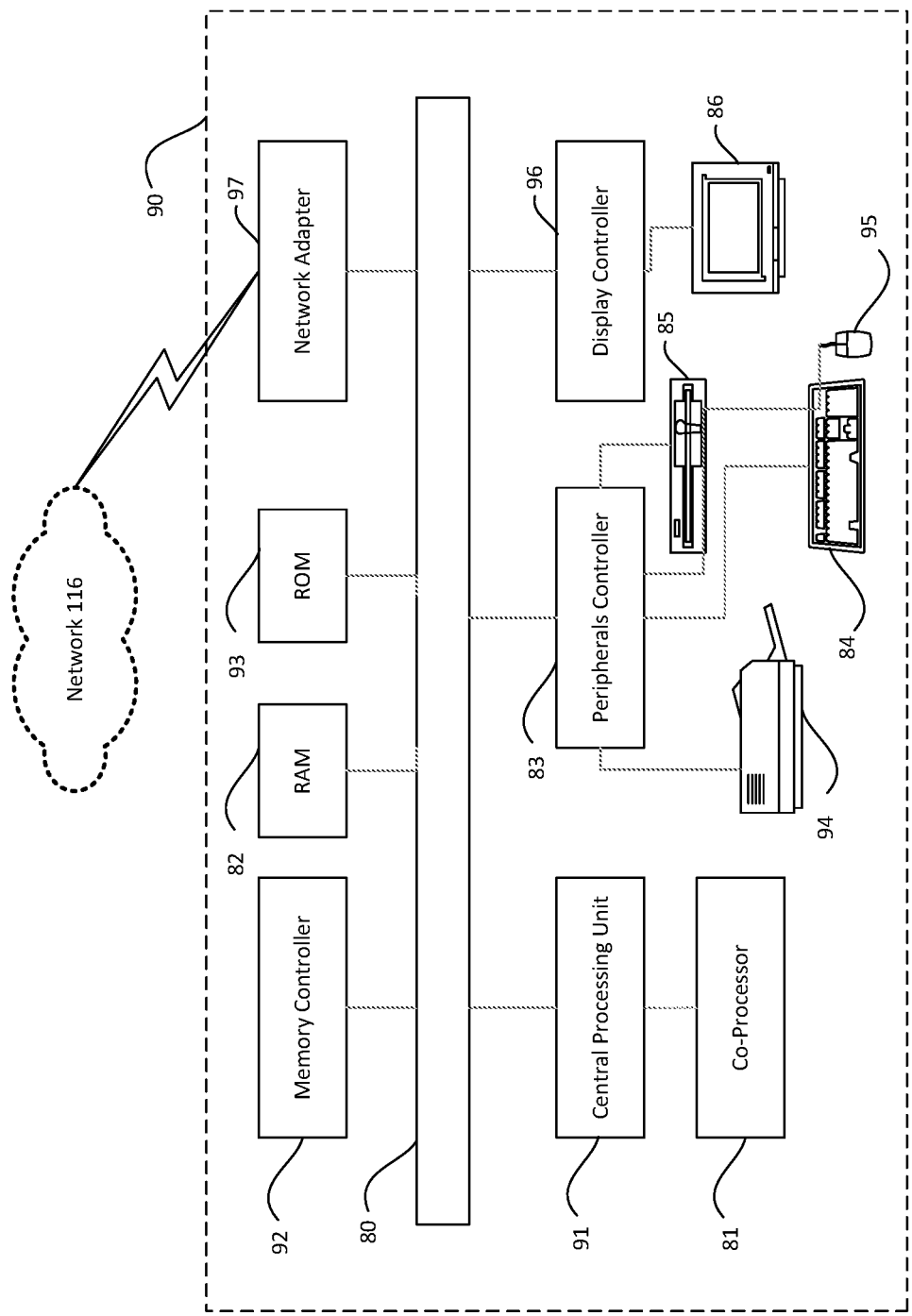
FIG. 1C illustrates a block diagram of an example computing system according to an aspect of the application.

The processor 32 may receive power from the power source 48, and may be configured to distribute and/or control the power to the other components in the scanning receiver 102. The power source 48 may be any suitable device for powering the scanning receiver 102. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like. The power source 48 may be additionally or alternatively configured to receive power from an external power source. The processor 32 may also be coupled to the GPS chipset 50, which is configured to provide location information regarding the location of the scanning receiver 102. It will be appreciated that the scanning receiver 102 may acquire location information by way of any suitable location-determination technique while remaining consistent with an embodiment FIG. 1C is a block diagram of an exemplary computing system 90 which may be used to implement components of the system, including a scanning receiver 102, the network device 108, the control system 106, and the control terminal 104 of FIG. 1A. The computing system 90 may comprise a computer or server and may be controlled primarily by computer readable instructions, which may be in the form of software, wherever, or by whatever means such software is stored or accessed. Such computer readable instructions may be executed within a processor, such as a central processing unit (CPU) 91, to cause the computing system 90 to do work. In many known workstations, servers, and personal computers, the central processing unit 91 is implemented by a single-chip CPU called a microprocessor. In other machines, the central processing unit 91 may comprise multiple processors. A coprocessor 81 is an optional processor, distinct from the main CPU 91 that performs additional functions or assists the CPU 91. The CPU 91 and/or the coprocessor 81 may receive radio spectrum data and radio signal data from a scanning receiver 102 to identify and track an unauthorized drone.

In operation, the CPU 91 fetches, decodes, executes instructions, and transfers information to and from other resources via the computer's main data-transfer path, system bus 80. Such a system bus connects the components in the computing system 90 and defines the medium for data exchange. The system bus 80 typically includes data lines for sending data, address lines for sending addresses, and control lines for sending interrupts and for operating the system bus 80. An example of such a system bus 80 may be the PCI (Peripheral Component Interconnect) bus or PCI Express (PCIe) bus.

Memories coupled to the system bus 80 include random access memory (RAM) 82 and read only memory (ROM) 93. Such memories include circuitry that allows information to be stored and retrieved. The ROMs 93 generally contain stored data that cannot easily be modified. Data stored in the RAM 82 may be read or changed by the CPU 91 or other hardware devices. Access to the RAM 82 and/or the ROM 93 may be controlled by the controller 92. The memory controller 92 may provide an address translation function that translates virtual addresses into physical addresses as instructions are executed. The memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, the computing system 90 may comprise a peripherals controller 83 responsible for communicating instructions from the CPU 91 to peripherals, such as a printer 94, a keyboard 84, a mouse 95, and a disk drive 85. A display 86, which is controlled by a display controller 96, is used to display visual output generated by the computing system 90. Such visual output may include text, graphics, animated graphics, and video. Visual output may further comprise a GUI. The display 86 may be implemented with a CRT-based video display, an LCD-based flat-panel display, gas plasma-based flat-panel display, or a touch-panel. The display controller 96 includes electronic components required to generate a video signal that is sent to the display 86.

Further, the computing system 90 may comprise communication circuitry, such as a network adaptor 97, that may be used to connect the computing system 90 to a communications network, such as the network device 108 or the network 116 of FIG. 1A, to enable the computing system 90 to communicate with other components of the system and network.

Figure 2:
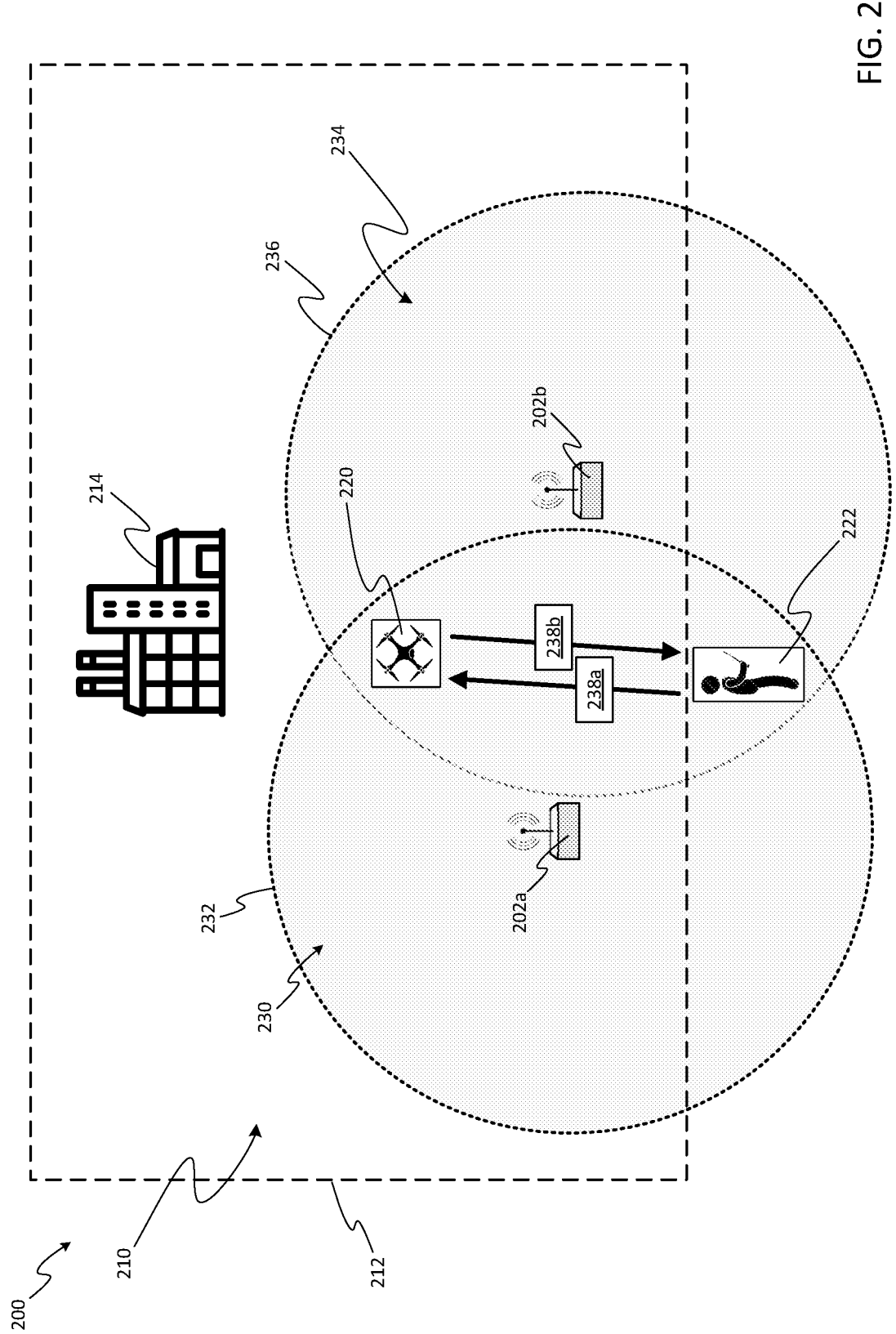
FIG. 2 illustrates a diagram of an example system according to an aspect of the application.

FIG. 2 illustrates an example system 200 according to which one or more example operations shall be discussed. In particular, the method 300 of FIG. 3 and the method 400 of FIG. 4 shall be discussed with reference to the system 200 and components thereof. The system 200 may be the same as or similar to, in at least some aspects, the system 100 of FIG. 1A. The system 200 includes an area 210 defined by a border 212 and including a facility 214. The area 210, the border 212, and the facility 214 may be the same as or similar to, in at least some aspects, the area 110, the border 112, and the facility 114 of FIG. 1A, respectively. For clarity of illustration, FIG. 2 does not depict a network device, a control system, a control terminal, or the communication lines between the various components. The system 200, however, is not so limited.

The system 200 further comprises a first scanning receiver 202a and a second scanning receiver 202b, both located within the area 210. The first and second scanning receivers 202a, 202b may be the same or similar to, in at least some aspects, as the scanning receiver 102 of FIG. 1A. The first scanning receiver 202a is configured to have a reception range 230 defined by the line 232. Similarly, the second scanning receiver 202b is configured to have a reception range 234 defined by the line 236. The reception range 230 may be based on the sensitivity (e.g., gain) of the first scanning receiver 202a, in particular the sensitivity of the antenna of the first scanning receiver 202a. The reception range 234 may be based on the sensitivity (e.g., gain) of the second scanning receiver 202b, in particular the sensitivity of the antenna of the second scanning receiver 202b. The reception ranges 230 and 234 may be based on a pre-defined sensitivity threshold. The sensitivity threshold may refer to a minimum signal strength or signal-to-noise ratio, for example, at which a scanning receiver 202 is able to extract usable information from the signal. The sensitivity threshold may be also purposefully set to effectuate a desired reception range. A reception range may be also affected by other factors, such as transmission power, environmental variables, or any intervening objects. These other factors may be considered as constant for purposes of the discussion herein. Additionally or alternatively, these other factors may be taken into account when determining the sensitivity threshold to effectuate a desired reception range.

In the example system 200, both the drone 220 and the controller unit 222 (as well as the controller unit 222 operator) are located within the reception range 230 of the first scanning receiver 202a and the reception range 234 of the second scanning receiver 202b. As such, the first scanning receiver 202a and the second scanning receiver 202b may detect and capture both the radio signals 238a from the controller unit 222 to the drone 220 and the radio signals 238b from the drone 220 to the controller unit 222. The radio signals 238a, 238b may be referred to generally as radio signal(s) 238. The radio signals 238 may be also variously referred to herein as radio transmissions or radio communications. The radio signals 238 may refer to one-way communications between the drone 220 and the controller unit 222 or two-way communications between the drone 220 and the controller unit 222.

The radio signals 238a from the controller unit 222 to the drone 220 may comprise control inputs for the drone 220. The control inputs, for example, may cause movements of the drone 220 or cause the drone 220 to capture sensor data or otherwise control the on-board sensor. The control inputs may cause the drone to execute a pre-defined operation, such as a hover or circling operation.

The radio signals 238b from the drone 220 to the controller unit 222 may comprise sensor data captured by a sensor of the drone 220 within the area 210 or telemetry data. The telemetry data may indicate a current location and/or recent locations of the drone 220. The telemetry data may include one or more coordinates (e.g., GPS coordinates) indicating a current location and/or recent locations of the drone 220. The telemetry data may be derived from the drone's 220 connection to a GPS system.

The sensor data may include a video stream, video data, one or more images, a sound stream, or sound data. The sensor data may include material detection data indicating detection of a particular (e.g., pre-determined or target) gas, chemical, air-born particulate, or other material. The sensor data may include material measurement data indicating a quantitative measure of a detected material, such as a density or concentration of a gas or air-born particulate. The sensor data, e.g., the material detection data, may include data (e.g., an emission spectrum) for use in spectroscopic analysis to identify a target substance or material.

The sensor data may have one or more characteristics. Characteristics of the sensor data may include a quality of video or sound data, such as video/image resolution, video frame rate, or sound bitrate. A characteristic of the sensor data may include the type of data of the sensor data. Types of data include a video stream, video data, an image, a sound stream, sound data, material detection data, or material measurement data. A characteristic of the sensor data may be indicated in metadata associated with the sensor data. The metadata may form part of the sensor data. Other characteristics that may be indicated in the metadata (or otherwise in the sensor data) include the time that the sensor data was captured, the location of the drone at the time that the sensor data was captured, an identifier of the drone that captured the sensor data, a brand of the controller unit, drone, sensor, transmitter, or receiver, or the type of sensor that captured the sensor data.

Figure 3:
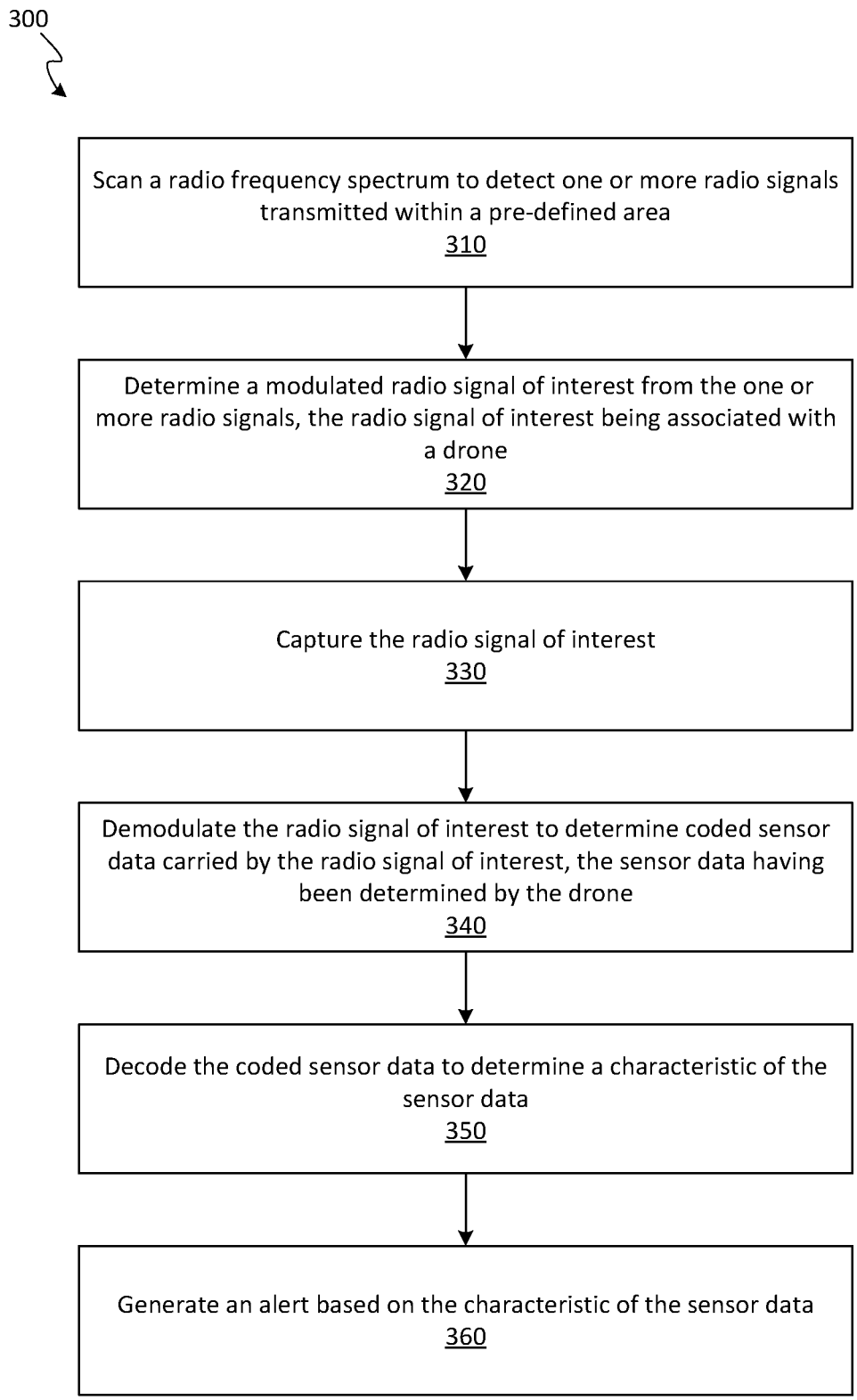
FIG. 3 illustrates a method flowchart according to an aspect of the application.

FIG. 3 illustrates a method 300 to detect a drone within an area, extract sensor data from radio signals sent by the drone, and generate an alert based on a characteristic of the sensor data. As indicated, the method 300 will be described with various references to the system 200 of FIG. 2.

At step 310, a radio frequency spectrum is scanned to detect (e.g., initially capture) one or more radio signals (e.g., the radio signals 238b) transmitted within a pre-defined area (e.g., the area 210). The one or more radio signals may have been transmitted by a drone (e.g., the drone 220) within the area. The one or more radio signals may be detected, via radio frequency spectrum scanning, by one or more scanning receivers (e.g., the first scanning receiver 202a and/or the second scanning receiver 202b). The one or more radio signals may be transmitted to a controller unit (e.g., the controller unit 222). The controller unit and associated operator may be located outside of the area, as shown in FIG. 2, or within the area. The controller unit may be within the reception range of the scanning receiver performing the radio frequency spectrum scan or may be outside of the reception range of said scanning receiver.

At step 320, a modulated radio signal of interest is determined from the one or more radio signals detected via the radio frequency spectrum scan. The radio signal of interest may be determined based on the radio frequency spectrum scan. The radio signal of interest may be additionally or alternatively determined based on system operator review via a control terminal (e.g., the control terminal 104 of FIG. 1A) and subsequent user input to a GUI (e.g., the GUI 105 of FIG. 1A) of the control terminal. The radio signal of interest may be associated with a drone (e.g., the drone 220) within the area. In an example, the radio signal of interest may be determined by comparing the radio frequency spectrum (or radio signals thereof) to known radio frequency spectrums (or radio signals thereof) that are each associated with one or more known drone makes and/or models. The radio signals captured via the radio frequency spectrum scan may be sent to the control system as frequency and amplitude (FA) packets. An alert may be generated responsive to determining the radio signal of interest. The alert may be given to the system operator via the GUI of the control terminal. The alert may be a text message or an email message.

At step 330, the radio signal of interest is captured (e.g., further captured after initial detection). The captured radio signal may be modulated. The radio signal of interest may be captured by one or more scanning receivers, such as a scanning receiver that performed the radio frequency scan or another scanning receiver. The radio signal of interest may be captured based on a control message, such as a control message from a control system (e.g. the control system 106 of FIG. 1A). The control message may instruct the scanning receiver to capture the radio signal of interest via a dedicated SDR channel of the scanning receiver. The control message may indicate the attenuation, center frequency, bandwidth, and bandwidth resolution for the dedicated channel. The attenuation, center frequency, bandwidth, and bandwidth resolution may be determined and input to the GUI of the control terminal by a system operator. The control message may further instruct the scanning receiver to dedicate one or more other SDR channels of the scanning receiver to perform additional radio frequency spectrum scans to detect other drones that may be in the area. Capturing the radio signal of interest may comprise recording digital I&Q data associated with the radio signal of interest and sending the digital I&Q data to the control system for demodulation.

At step 340, the radio signal of interest is demodulated to determine coded sensor data carried by the radio signal of interest. The sensor data may have been determined and/or captured by the drone associated with the radio signal of interest. Demodulating the radio signal of interest may comprise determining or selecting a demodulation scheme from a plurality of potential demodulation schemes. Determining or selecting the demodulation scheme may be performed automatically by the control system or control terminal or may be performed by the control system or control terminal based on system operator input to the GUI of the control terminal. Determining or selecting the demodulation scheme may be performed by the system operator. For example, the system operator may select the demodulation scheme from a pull-down menu on the GUI listing potential demodulation schemes. Determining the demodulation scheme may be additionally or alternatively based on one or more of spectral fingerprinting (e.g., a spectral signature), a brand name of the controller unit, a brand name of the drone's telemetry component(s), a brand name of the video transmitter of the drone, or a spectral mask associated with the radio signal of interest.

At step 350, the coded sensor data is decoded to determine a characteristic (e.g., one or more characteristics) of the sensor data. Decoding the coded sensor data may comprise determining a decoding algorithm to use in decoding the coded sensor data. Determining the decoding algorithm and decoding the coded sensor data may be executed by the control system or control terminal. Additionally or alternatively, the decoding algorithm may be selected by the system operator at the control terminal. For example, the system operator may select the decoding algorithm from a pull-down menu of possible decoding algorithms and/or associated manufacturers. The decoding algorithms and/or associated manufacturers in the pull-down menu may include those associated with the frequency range and/or modulation scheme of the radio signal of interest. The result of an attempted decoding of video data may be displayed on the GUI of the control terminal. If video data resulting from the attempt to decode is incoherent, the system operator may select another decoding algorithm to use in a subsequent attempt to decode. The decoded sensor data may be recorded and stored at the control system and/or the control terminal.

The sensor data may comprise data captured by one or more sensors of the drone. The sensor data may comprise a video stream, video data, one or more images, a sound stream, or sound data. The sensor data may comprise material detection data indicating that a particular (e.g., predetermined or target) gas, chemical, air-born particulate, or other material has been detected by the drone. The sensor data may comprise material measurement data indicating a quantitative measurement associated with a detected material. For example, the sensor data may indicate a density or concentration of a gas or air-born particulate. The sensor data may comprise environmental data indicating one or more environmental variables associated with the area. For example, environmental variables may include a temperature or a sound level.

A characteristic of the sensor data may include a quality of video or sound data. For example, a characteristic may include a video/image resolution, video frame rate, or a sound bitrate. A characteristic may include the type of data (i.e., data type) of the sensor data. For example, types of data may include a video stream, video data, an image, a sound stream, sound data, material detection data, spectroscopy data, or measurement data. A characteristic or data type of the sensor data may refer to the subject material of material detection data or measurement data. Metadata associated with or forming part of the sensor data may indicate a characteristic of the sensor data. Other characteristics of the sensor data that may tend to be included in the metadata include the time that the sensor data was captured or determined, an identifier of the drone that captured the sensor data, the type of sensor that captured the sensor data, or a brand of the controller unit, drone, sensor, transmitter, or receiver.

At step 360, an alert is generated based on the characteristic of the sensor data. The alert may comprise a visual alert displayed to the system operator via the GUI of the control terminal. The alert may comprise a sound alert generated by the control terminal to notify the system operator. The alert may comprise a text message or an email message. The alert may indicate the characteristic of the sensor data and/or the sensor data itself if possible.

The alert may be generated, generally, if the characteristic of the sensor data indicates that the detected drone is performing unauthorized and/or undesirable activities, including sensor data capture. In an aspect, the alert may be generated based on comparing the characteristic of the sensor data to a pre-defined characteristic. The alert may be generated if there is a match between the two.

For example, a data type characteristic of the sensor data may be compared to a pre-defined data type. For instance, a sports facility (e.g., a stadium or ball park) operator may be concerned that a drone may capture an unauthorized video recording of a sports event. In this case, the pre-defined data type may be video data. If the data type of the sensor data is found to be video data, an alert may be generated. A similar scenario may occur with respect to a concert venue operator and audio data.

As another example, a pre-defined characteristic may relate to a subject material identified in material detection data or measurement data. If the sensor data indicates a detection of the subject material by the drone or a measurement for the subject material captured by the drone, an alert may be generated. For instance, a confidential industrial process may produce a tell-tale gas in the nearby area. Thus the pre-defined characteristic may be associated with this particular gas. If the sensor data indicates detection of the gas or comprises a measurement for the gas, an alert may be generated.

As yet another example, the pre-defined characteristic may relate to a quality metric of the sensor data, such as defining a threshold range for the quality metric. For instance, the pre-defined characteristic may relate to video resolution, such as a threshold video resolution. If the sensor data comprises video data with a video resolution above the video resolution threshold (e.g., High Definition (HD) video data), an alert may be generated because a facility operator may be concerned that confidential information may be discovered using HD video data. Conversely, if the sensor data comprises low resolution video data, no alert may be generated.

Additionally or alternatively, generating an alert may be based on determining if the sensor data is associated with a pre-defined activity in the area or at the facility. For example, the area may comprise a large parcel of rural land with a military research and development facility. If the sensor data is associated with the research and development activities, an alert may be generated. For instance, an alert may be generated based on the sensor data comprising image data of the research and development facility. Conversely, no alert may be generated if the sensor data comprises only image data of wildlife in the area.

Additionally or alternatively, generating the alert may be based on a location and/or movement of the drone, such as within the area. Determining the location and/or movement of the drone may be achieved in one or more ways. For example, the radio signal of interest discussed in relation to steps 320, 330, and 340 may comprise telemetry data generated by the drone. The telemetry data may be demodulated and decoded along with or in the same manner as the sensor data. The telemetry data may comprise one or more sets of location coordinates (e.g. GPS coordinates) of the drone. Movement of the drone may be determined based on sequential, timed sets of coordinates. Determining the location and/or movement of the drone may be achieved using a multilateration technique, particularly when the system comprises two or more scanning receivers that receive the radio signal from the drone. An example multilateration technique may be a TDOA technique. The location and/or movement of the drone may be also determined based on video data, such as video data from the sensor data. The location and/or movement of the drone may be shown to the system operator via a geographical display on the GUI of the control terminal.

Generating the alert may be based on a proximity of the drone (e.g., the drone's location) to the facility or other landmark in the area. If the drone is far away from the facility or a sensitive portion of the area, no alert may be generated. Conversely, if the drone is near the facility or the portion of the area, an alert may be generated. Generating the alert may be based on a directionality and/or speed of the drone (e.g., a movement vector), such as relative to the facility or aforementioned sensitive portion of the area. Fast movement towards the facility or the sensitive portion of the area may warrant an alert. But movement away from the facility or the sensitive portion of the area may not require an alert. Movement speed may also suggest the performance capabilities of the drone. If fast movement is determined, an alert may be generated because the drone may be a more sophisticated and expensive model that is more likely to be used by a bad-intentioned operator than an innocent hobbyist.

Figure 4:
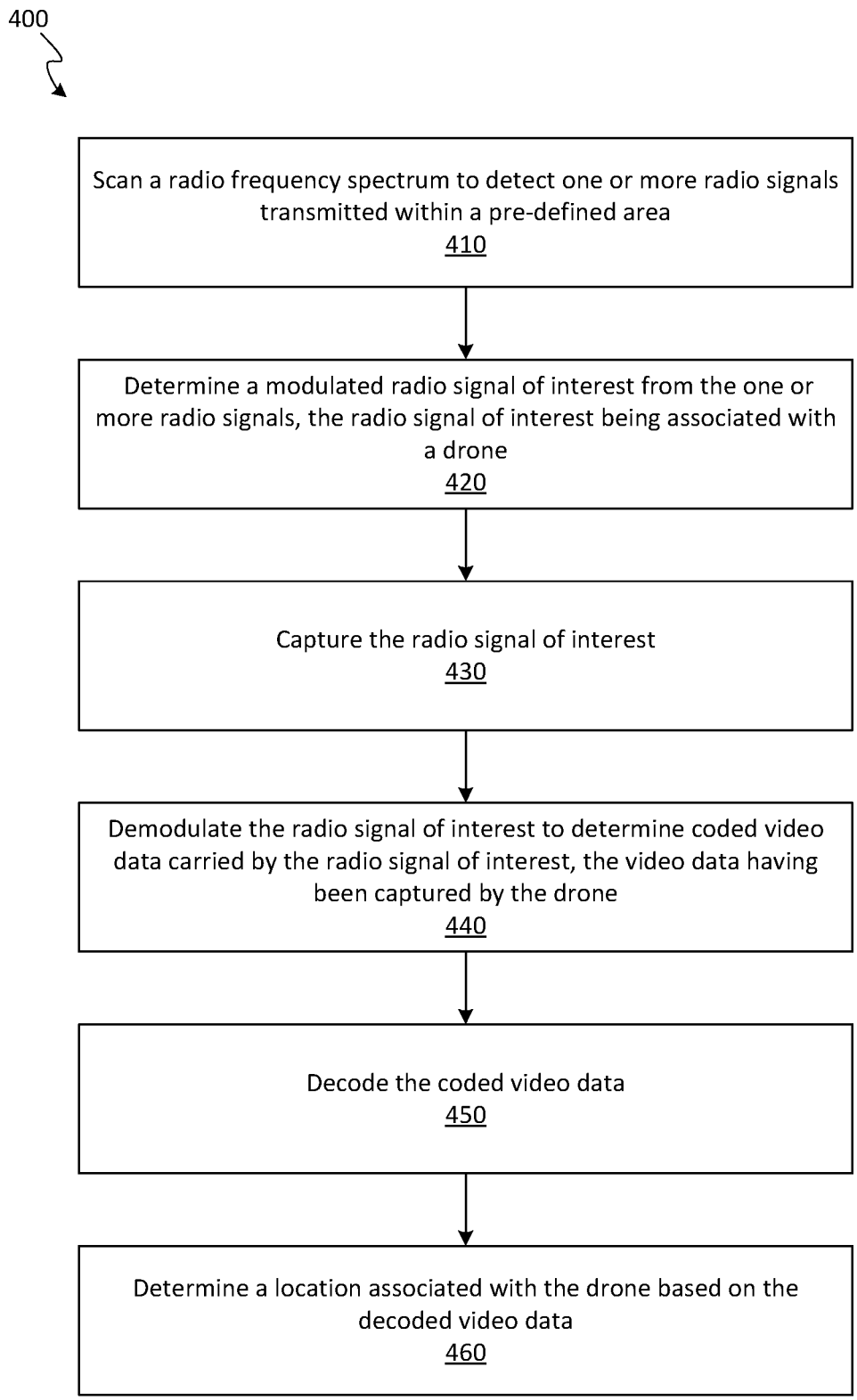
FIG. 4 illustrates a method flowchart according to an aspect of the application.

FIG. 4 illustrates a method 400 for determining a location associated with a drone. The location associated with the drone may comprise the location of the drone, the location of the associated controller unit, or the location of the operator of the controller unit. The method 400 may additionally or alternatively generate an alert based on the location associated with the drone. As indicated, the method 400 will be described with various references to the system 200 of FIG. 2.

At step 410, a radio frequency spectrum is scanned to detect (e.g., initially capture) one or more radio signals (e.g., the radio signals 238a, 238b) transmitted within a predefined area (e.g., the area 210). The one or more radio signals may be detected, via radio frequency spectrum scanning, by one or more scanning receivers (e.g., the first scanning receiver 202a and/or the second scanning receiver 202b). The one or more radio signals may comprise one or more radio signals from the drone to the controller unit and/or one or more radio signals from the controller unit to the drone. The controller unit and associated operator may be located outside of the area, as shown in FIG. 2, or within the area. The controller unit may be within the reception range of the scanning receiver performing the radio frequency spectrum scan or may be outside of the reception range of said scanning receiver.

At step 420, a modulated radio signal of interest is determined from the one or more radio signals detected via the radio frequency spectrum scan. The radio signal of interest may be determined based on the radio frequency spectrum scan. The radio signal of interest may be associated with a drone (e.g., the drone 220) within the area. The radio signals detected via the radio frequency spectrum scan may be sent to the control system as frequency and amplitude FA) packets. Step 420 may be performed in the same or similar manner, in at least some aspects, as step 320 of FIG. 3.

At step 430, the radio signal of interest is captured (e.g., further captured after initial detection). The captured radio signal may be modulated. The radio signal of interest may be captured by one or more scanning receivers, such as a scanning receiver that performed the radio frequency scan or another scanning receiver. The radio signal of interest may be captured based on a control message, such as a control message from a control system (e.g. the control system 106 of FIG. 1A). Capturing the radio signal of interest may comprise recording digital I&Q data associated with the radio signal of interest and sending the digital I&Q data to the control system for demodulation. Step 430 may be performed in the same or similar manner, in at least some aspects, as step 330 of FIG. 3.

At step 440, the radio signal of interest is demodulated to determine coded video data carried by the radio signal of interest. The video data may have been determined and/or captured by the drone associated with the radio signal of interest. Demodulating the radio signal of interest may comprise determining or selecting a demodulation scheme from a plurality of potential demodulation schemes. Step 440 may be performed in the same or similar manner, in at least some aspects, as step 340 of FIG. 3 except with respect to video data rather than or in addition to sensor data generally.

At step 450, the coded video data is decoded. Decoding the coded video data may comprise determining a decoding algorithm to use in decoding the coded video data. Decoding the coded video data may be performed in the same or similar manner, in at least some aspects, as decoding the coded sensor data described in relation to step 350 of FIG. 3.

The decoded video data may comprise a video stream or a portion of a video stream captured by the drone's on-board camera while in-flight, before taking flight, or after taking flight. The video data additionally or alternatively may comprise one or more images. The one or more images may be discontinuous with one another. That is, the one or more images may be images that are not part of a video. The video data may comprise video or images of the area, the facility, or other physical features of the area. The video data may comprise video or images of physical features outside of the defined area. Physical features may comprise, for example, a building, a parking lot, or a geographic landmark (e.g., a group of trees, a body of water, a hill, or even a far-off mountain range or other large-scale feature). The video data may comprise video or images of the controller unit operator, such as when the drone initially takes flight or when the drone lands and is recovered by the controller unit operator.

At step 460, a location associated with the drone is determined based on the decoded video data. The determined location may be a current location of the drone or a past (e.g., recent) location of the drone. The determined location may be a location of the controller unit and/or its operator. A location may be represented as a set of geographical coordinates. A location may be represented as a sub-region of the area, such as a grid sub-region. Additionally or alternatively, a location may be represented as an altitude, such as the altitude of the drone.

As an example of determining the location associated with the drone based on the decoded video data, the video data may be shown to a system operator via the GUI of the control terminal. The system operator may analyze the video data and, preferably, identify one or more physical features depicted in the video data. The system operator is preferably familiar with the area. The identified physical feature(s) may be used as a point of reference to determine the location associated with the drone. For example, the video data may comprise images of the west side of a known building in the area. Thus the system operator may determine that the drone is located west of the building. The scale of the building within the images may be also used in determining the location of the drone, with a larger scale indicating that the drone is relatively close to the building and a smaller scale indicating that the drone is relatively far from the building. The relative scales of the building or other physical feature over multiple frames of the video data may be used to determine movement of the drone and thus also the location of the drone. The system operator may also recognize a person depicted in the video data as the controller unit operator. The location of the drone at the time the person is depicted in the video data may be used as the location of the controller unit or operator thereof.

The system operator may input the location associated with the drone into the control terminal, such as via the control terminal's GUI. For example, the system operator may input the coordinates (e.g., geographical coordinates) of the location. As another example, the system operator may input a sub-region of the area. The area may be divided into a grid of sub-regions and the system operator may input the grid corresponding to the location. The system operator may input the location via a text input (e.g., "grid sub-region 3B"). The system operator may input the location by selecting an interface element corresponding to the location, such as via a pull-down menu of possible locations. The system operator may input the location via a geographical display (e.g., map) of the area in the GUI. For example, the system operator may click on or otherwise identify the location in the geographical display that corresponds to the location associated with the drone. As another example, the geographical display may be divided into a grid of sub-regions and the operator may click on or otherwise identify the grid sub-region that corresponds to the location associated with the drone.

Additionally or alternatively, the location associated with the drone may be determined by the control system or control terminal. For example, the control system or control terminal may apply image recognition techniques to the decoded video data to identify one or more physical features or a person (e.g., the controller unit operator) in the video data. The image recognition techniques may determine a facing or angle of the physical feature relative to the drone. For example, the image recognition techniques may identify which side of a building is depicted in the video data and this may be used to determine the location associated with the drone. The image recognition techniques may identify a relative scale of a physical feature shown in the video data, including any changes to the scale of the physical features over multiple frames or images of the video data. The scale of the physical feature may be used to determine the location associated with the drone (as well as any movement). For example, the scale of the physical feature may be used to determine a distance between the drone and the physical feature at the time of the video or image capture. The above-noted angle of the drone relative to the physical feature and the distance between the drone and the physical feature may be used in combination to determine the location of the drone.

Additionally or alternatively, the location associated with the drone may be determined based on auxiliary data associated with the video data. For example, the video data may comprise an on-screen display (OSD) superimposed on the video or image. The OSD may indicate the location of the drone at the time that the video, video frame, or image was captured. As another example, the video data may comprise an audio channel that indicates the location of the drone at the time the video data was captured. The drone may insert the OSD or audio channel based on telemetry data (e.g., GPS coordinates) received by or determined by the drone.

The location associated with the drone may be determined using other techniques in addition to or as an alternative to the video data techniques described herein. For example, the radio signal of interest may comprise telemetry data that indicates the location of the drone. The telemetry data may be demodulated and decoded along with, or in a similar manner as, the video data. As another example, the location associated with the drone may be determined using a multilateration technique, particularly when the system comprises two or more scanning receivers that receive the radio signal from the drone. An example multilateration technique may be a TDOA technique. When the system comprises three or more scanning receivers, the altitude of the drone may be also determined.

An alert may be generated based on the location associated with the drone. The alert may comprise a visual alert displayed to the system operator via the GUI of the control terminal. The alert may comprise a sound alert generated by the control terminal to notify the system operator. The alert may comprise a text message or an email message. The alert may indicate the location associated with the drone, such as the location of the drone, the location of the controller unit, or the location of the controller unit operator.

Generally, the alert may be generated if the location associated with the drone indicates or suggests that the presence or activity of the drone in the area may be harmful or done with ill intent. For example, an alert may be generated if the drone is found to be near (e.g., less than a threshold distance) the facility or other sub-region of the area associated with confidential activity. Conversely, no alert may be generated if the drone is found to be far away (e.g., greater than a threshold distance) from the facility or other sub-region of the area associated with confidential activity. Generating the alert may be additionally or alternatively based on a determined movement of the drone. The movement of the drone, including a directionality and speed, may be determined based on a timed sequence of locations of the drone. Generating the alert may be additionally or alternatively based on sensor data identified in the radio signal of interest, such as is described in relation to the method 300 of FIG. 3.

Figure 5:
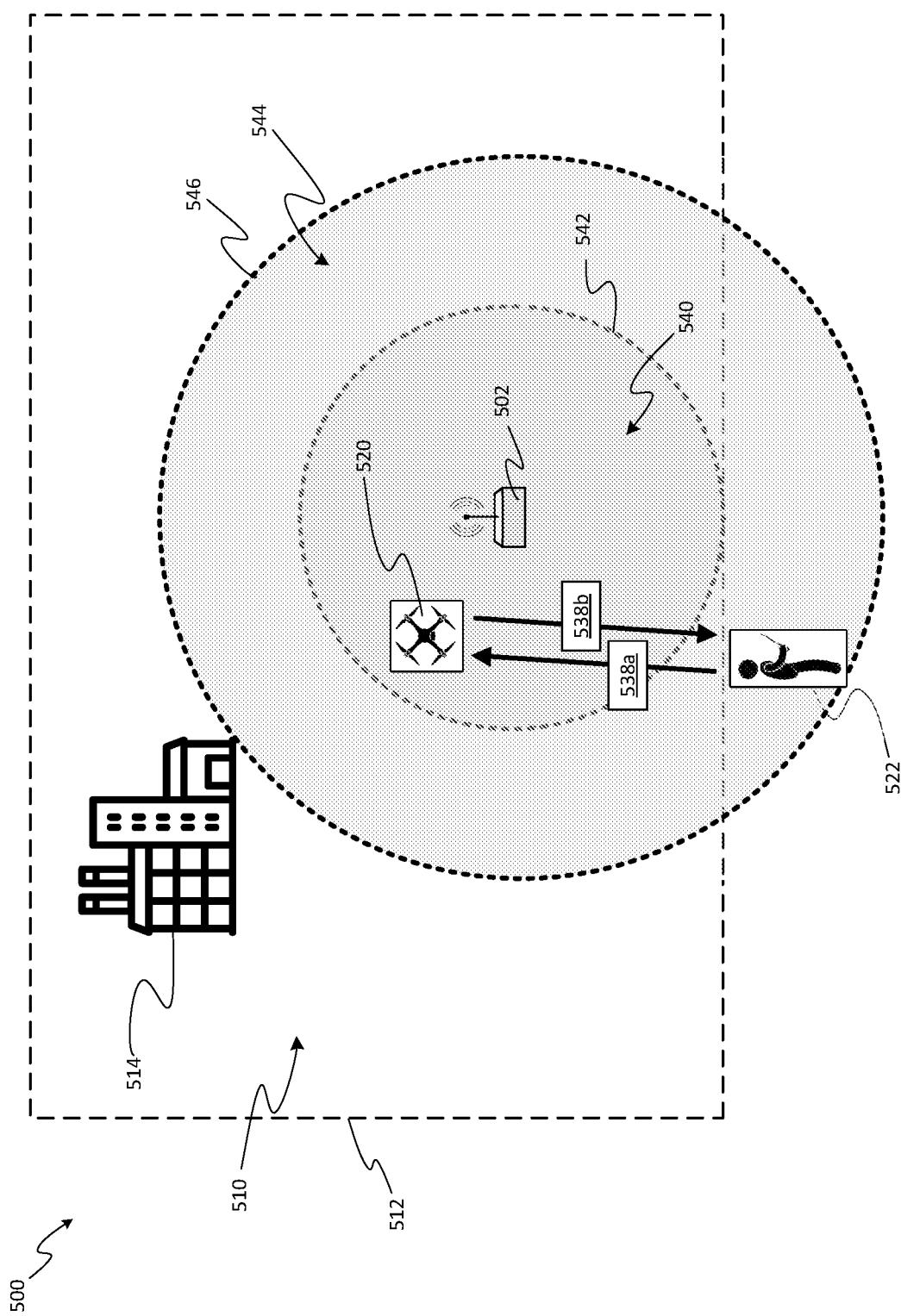
FIG. 5 illustrates an example system according to an aspect of the application.

FIG. 5 illustrates an example system 500 according to which one or more example operations shall be discussed. In particular, the method 600 of FIG. 6 shall be discussed with reference to the system 500 and components thereof. The system 500 and the method 600 relate generally to adjusting a scanning receiver's sensitivity (i.e., reception range) in response to identifying a radio signal of interest associated with a drone in the area.

The system 500 may be the same as or similar to, in at least some aspects, the system 100 of FIG. 1A and the system 200 of FIG. 2. The system 500 includes an area 510 defined by a border 512 and including a facility 514. The area 510, the border 512, and the facility 514 may be the same as or similar to, in at least some aspects, the areas 110, 210, the borders 112, 212, and the facilities 114, 214 of FIG. 1A and FIG. 2, respectively. For clarity of illustration, FIG. 5 does not depict a network device, a control system, a control terminal, or the communication lines between the various components. The system 500, however, is not so limited.

The system 500 comprises a scanning receiver 502 within the area 510. The scanning receiver 502 may be the same as or similar to, in at least some aspects, the scanning receiver 102 of FIG. 1A or the first and second scanning receivers 202a, 202b of FIG. 2. The scanning receiver 502 is configured to have a first reception range 540 defined by the line 542. The scanning receiver 502 may be configured to have a second reception range 544 defined by the line 546. The second reception range 544 may be an adjusted reception range relative to the first reception range 540 or vice versa.

The first and second reception ranges 540, 544 may be based on the sensitivity (e.g., gain) of the scanning receiver 502, in particular the sensitivity of the antenna of the scanning receiver 502. The first and second reception ranges 540, 544 may be based on a pre-defined sensitivity threshold. The sensitivity threshold may refer to a minimum signal strength or signal-to-noise ratio, for example, at which the scanning receiver 502 is able to extract usable information from the signal. The sensitivity threshold may be also purposefully set to effectuate a desired reception range, such as the first reception range 540 and the second reception range 544.

In an example, the scanning receiver 502 is initially configured with the first reception range 540. The drone 520 is detected in the first reception range 540. The drone's 520 controller unit 522 is outside of the first reception range 540 however. In this configuration, the scanning receiver 502 may capture radio signals 538b transmitted by the drone 520 to the controller unit 522. Yet the scanning receiver 502 is not able to capture radio signals 538a transmitted by the controller unit 522 to the drone 520 because the controller unit 522 is outside of the first reception range 540. To capture the radio signals 538a from the controller unit 522, the sensitivity threshold of the drone 520 may be adjusted to expand the initial first reception range 540 to the second reception range 544 which does encompass the controller unit 522. In this example, the first reception range 540 abuts the border 512 of the area 510 but does not extend beyond. This may be implemented so that alerts are not unnecessarily generated based on radio signals generated outside of the area 510. For example, a drone operating outside of the area 510 may be of no concern to the parties responsible for securing the area 510. The second reception range 544 does extend beyond the area 510 but may be done so to capture radio signals transmitted by the controller unit 522. The configuration of the scanning receiving 502 with the second reception range 544 may be temporary. For example, when the drone 520 leaves the area or when any operations associated with the drone 520 are deemed complete, the scanning receiver 502 may be reconfigured with the first reception range 540.

Figure 6:
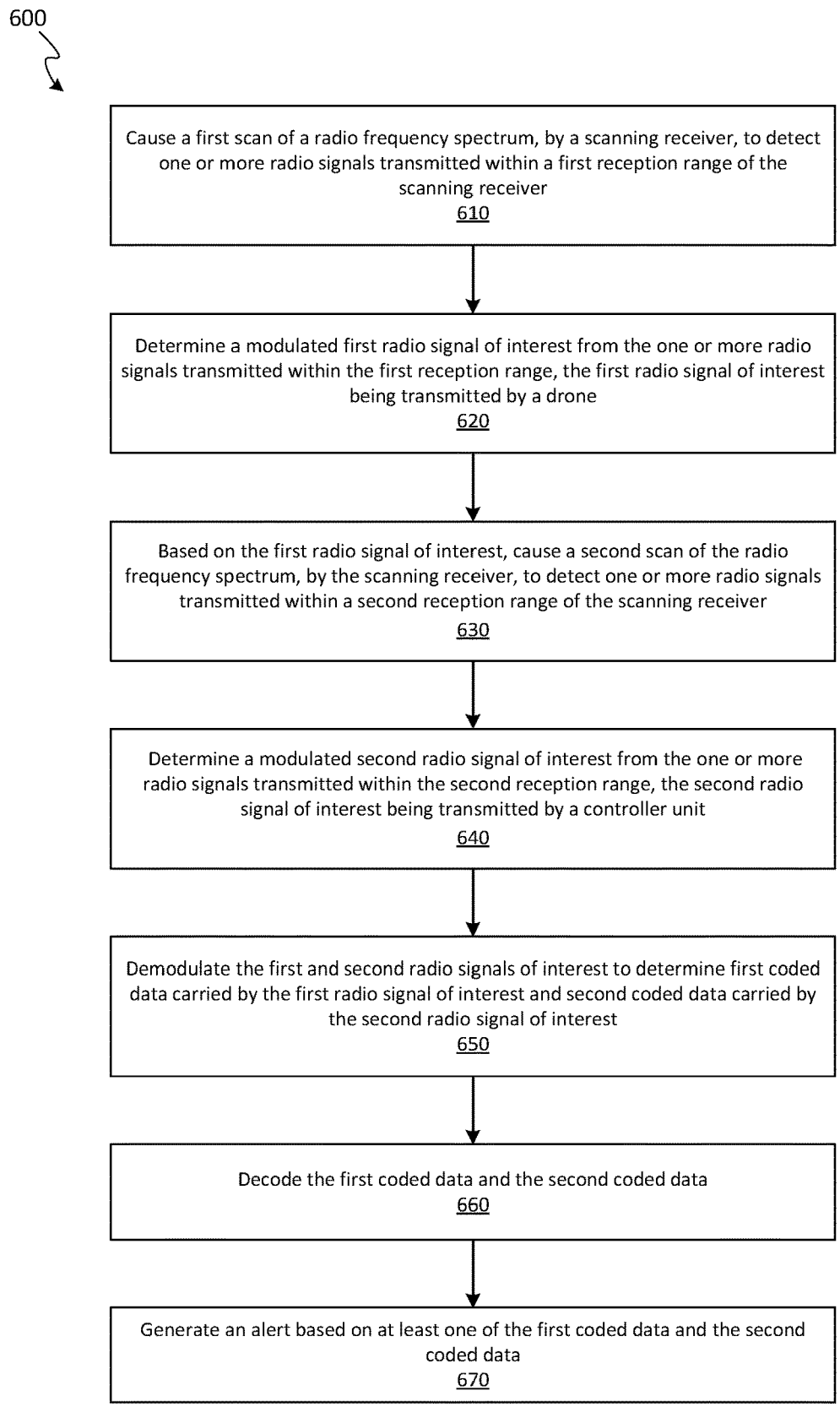
FIG. 6 illustrates a method flowchart according to an aspect of the application.

FIG. 6 illustrates a method 600 to capture radio signal data between a drone and the associated controller unit where the drone is within a pre-defined area and the controller unit is outside of the pre-defined area. The method 600 includes adjusting a scanning receiver's reception range from a first reception range that only encompasses the drone to a second reception range that also encompasses the controller unit. As indicated, the method 600 will be described with various references to the system 500 of FIG. 5.

At step 610, a first scan of a radio frequency spectrum is performed by a scanning receiver (e.g., the scanning receiver 502) to detect (e.g., initially capture) one or more radio signals transmitted within a first reception range (e.g., the first reception range 540) of the scanning receiver. The first reception range may be defined by a first sensitivity threshold of the scanning receiver. Step 610 may comprise configuring the scanning receiver with the first sensitivity threshold. The first reception range may be limited to a pre-defined area (e.g., the area 510). That is, the first reception range may not extend beyond the pre-defined area.

At step 620, a modulated first radio signal of interest from the one or more radio signals transmitted within the first reception range is determined. Determining the modulated first radio signal of interest may comprise further capturing the first radio signal of interest. The one or more radio signals transmitted within the first reception range may have been transmitted by a drone (e.g., the drone 520). Determining the first radio signal of interest may be based on the first scan of the radio frequency spectrum. Step 620 may comprise determining that the first radio signal of interest was transmitted by a drone. For example, the first radio signal of interest may comprise sensor data that was captured by the drone or that is typically captured by a drone in general. As another example, the first radio signal of interest may comprise telemetry data. Step 620 may comprise determining that the first radio signal of interest was not transmitted by a controller unit (e.g., the controller unit 522), particularly a controller unit associated with the drone.

At step 630, a second scan of the radio frequency spectrum is performed by the scanning receiver to detect (e.g., initially capture) one or more radio signals transmitted within a second reception range (e.g., the second reception range 544) of the scanning receiver. The second reception range may be defined by a second sensitivity threshold of the scanning receiver. Step 630 may comprise configuring the scanning receiver with the second sensitivity threshold. Step 630 may comprise reconfiguring the scanning receiver from the first reception range to the second reception range. The second reception range may extend beyond the pre-defined area. The first reception range may be within the second reception range. The second scan of the radio frequency spectrum may be based on determining that other radio signals from the first scan of the radio frequency spectrum are not from a controller unit associated with the drone.

At step 640, a modulated second radio signal of interest from the one or more radio signals transmitted within the second reception range is determined. Determining the modulated second radio signal of interest may comprise further capturing the second radio signal of interest. The one or more radio signals transmitted within the second reception range may have been transmitted by a controller unit associated with the drone. Determining the second radio signal of interest may be based on the second scan of the radio frequency spectrum. Step 640 may comprise determining that the second radio signal of interest was transmitted by a controller unit, particularly the controller unit associated with the drone. For example, the second radio signal of interest may comprise control input data that is typically transmitted by a controller unit to a drone. Step 640 may comprise determining that the second radio signal of interest was not transmitted by a drone, particularly the drone that transmitted the first radio signal of interest.

At step 650, the first and second radio signals of interest are demodulated to determine first coded data carried by the first radio signal of interest and second coded data carried by the second radio signal of interest. The first coded data may comprise coded sensor data and/or coded telemetry data. The second coded data may comprise coded control input data. Demodulating the first and second radio signals of interest may comprise determining or selecting one or more demodulation schemes from a plurality of potential demodulation schemes. Step 650 may be performed in the same or similar manner, in at least some aspects, as steps 340, 440 of FIGS. 3 and 4, respectively.

At step 660, the first coded data and the second coded data are decoded. The first decoded data may comprise sensor data, such as is described, for example, in relation to steps 350, 450 of FIGS. 3 and 4, respectively. The first decoded data may additionally or alternatively comprise telemetry data, such as GPS coordinates of the drone's location. The second decoded data may comprise control inputs from the controller unit. For example, the controller unit's operator may input the control inputs. The control inputs may control movement of the drones and/or sensor data capture, for example. Decoding the first and second coded data may be performed in the same or similar manner, in at least some aspects, as the decoding described in relation to steps 350, 450 of FIGS. 3 and 4, respectively.

At step 670, an alert may be generated based on at least one of the first coded data and the second coded data. For example, the alert may be generated based on the first coded data and the second coded data. The alert may be the same as or similar to, in at least some aspects, the alerts discussed in relation to the methods 300, 400 of FIGS. 3 and 4, respectively. Likewise, the alert may be generated on the same or similar basis or bases as the alerts discussed in relation to the methods 300, 400.

While the system and method have been described in terms of what are presently considered specific embodiments, the disclosure need not be limited to the disclosed embodiments. It is intended to cover various modifications and similar arrangements included within the spirit and scope of the claims, the scope of which should be accorded the broadest interpretation to encompass all such modifications and similar structures. The present disclosure includes any and all embodiments of the following claims.

What is claimed is:

1. A non-transitory computer readable medium including program instructions that when executed by a processor effectuate:
   causing a scan of a radio frequency spectrum to detect one or more radio signals transmitted within a pre-defined area;
   causing a capture of a radio signal of interest from the one or more radio signals;
   demodulating the radio signal of interest to determine coded sensor data carried thereon;
   decoding the coded sensor data to determine a characteristic of the sensor data; and
   generating an alert based on the characteristic of the sensor data.

2. The non-transitory computer readable medium of claim 1, wherein the generated alert includes a comparison of the characteristic of the sensor data to a pre-defined characteristic.

3. The non-transitory computer readable medium of claim 1, wherein the program instructions further include comparing the detected one or more radio signals to a set of known radio signals.

4. The non-transitory computer readable medium of claim 1, wherein the sensor data comprises at least one of video data, image data, sound data, material detection data, material measurement data and environmental data.

5. The non-transitory computer readable medium of claim 1, wherein the characteristic of the sensor data comprises at least one of a data type of the sensor data, a material associated with the sensor data, a time of capture of the sensor data, a location of capture of the sensor data, a video quality metric, an audio quality metric, and a sensor type associated with the sensor data.

6. The non-transitory computer readable medium of claim 1, wherein the captured radio signal of interest is based on a control message transmitted to a scanning receiver located within the pre-defined area.

7. The non-transitory computer readable medium of claim 6, wherein the control message is based on operator input at a graphical user interface associated with a control terminal.

8. A non-transitory computer readable medium including program instructions that when executed by a processor effectuate:
   causing a scan of a radio frequency spectrum to detect one or more radio signals transmitted within a pre-defined area;
   causing a capture of a radio signal of interest associated with a device;
   demodulating the radio signal of interest to determine coded video data carried thereon;
   decoding the coded video data; and
   determining a location associated with the device based on the decoded video data.

9. The non-transitory computer readable medium of claim 8, wherein the program instructions further include generating an alert based on the location associated with the device.

10. The non-transitory computer readable medium of claim 8, wherein the video data indicates one or more physical features associated with the pre-defined area and the determining the location associated with the device is further based on the one or more physical features.

11. The non-transitory computer readable medium of claim 10, wherein the determination comprises at least one of:
   determining a facing of a physical feature of the one or more physical features relative to the device; and
   determining a relative scale of a physical feature of the one or more physical features.

12. The non-transitory computer readable medium of claim 8, wherein the program instructions further include causing to display, via a graphical user interface, the video data.

13. The non-transitory computer readable medium of claim 12, wherein the determination comprises receiving an operator input, via the graphical user interface, indicating the location associated with the device.

14. The non-transitory computer readable medium of claim 8, wherein the location associated with the device comprises a location of at least one of the device, a controller unit associated with the device, and an operator associated with the controller unit.

15. A non-transitory computer readable medium including program instructions that when executed by a processor effectuate:
    causing a first scan of a radio frequency spectrum, by a scanning receiver, to detect one or more radio signals transmitted within a pre-defined area and a first reception range of the scanning receiver;
    determining a modulated first radio signal of interest from the one or more radio signals transmitted within the first reception range;
    based on the first radio signal of interest, causing a second scan of the radio frequency spectrum, by the scanning receiver, to detect one or more radio signals transmitted within a second reception range of the scanning receiver;
    determining a modulated second radio signal of interest from the one or more radio signals transmitted within the second reception range;
    demodulating the first and second radio signals of interest to determine first coded data carried by the first radio signal of interest and second coded data carried by the second radio signal of interest; and
    generating an alert based on at least one of the first coded data and the second coded data.

16. The non-transitory computer readable medium of claim 15, wherein the program instructions further include reconfiguring the scanning receiver from a first sensitivity threshold to a second sensitivity threshold,
    wherein the first sensitivity threshold defines the first reception range and the second sensitivity threshold defines the second reception range.

17. The non-transitory computer readable medium of claim 15, wherein the first reception range is encompassed by the pre-defined area and the second reception range partially extends beyond the pre-defined area.

18. The non-transitory computer readable medium of claim 15, wherein the first coded data comprises at least one of sensor data and telemetry data and the second coded data comprises control input data.

19. The non-transitory computer readable medium of claim 15, wherein the causing the second scan of the radio frequency spectrum includes determining the one or more radio signals transmitted within the first reception range is not transmitted from a controller unit associated with a device.

20. The non-transitory computer readable medium of claim 15, wherein a controller unit associated with the second radio signal of interest is located external to the pre-defined area and external to the first reception range.

* * * * *